United States Patent
Shrinivasan et al.

(10) Patent No.: US 10,579,828 B2
(45) Date of Patent: Mar. 3, 2020

(54) METHOD AND SYSTEM TO PREVENT INFERENCE OF PERSONAL INFORMATION USING PATTERN NEUTRALIZATION TECHNIQUES

(71) Applicant: International Business Machines Corporation, Armonk, NY (US)

(72) Inventors: Yedendra Shrinivasan, Yorktown Heights, NY (US); Vijay Ekambaram, Tamilnadu (IN); Nitin Gupta, New Delhi (IN); Pratyush Kumar, Guindy (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/665,937

(22) Filed: Aug. 1, 2017

(65) Prior Publication Data
US 2019/0042790 A1 Feb. 7, 2019

(51) Int. Cl.
| G06F 21/62 | (2013.01) |
| G06F 17/30 | (2006.01) |
| G06F 16/951 | (2019.01) |
| G06F 16/335 | (2019.01) |
| G06F 21/31 | (2013.01) |

(52) U.S. Cl.
CPC ........ *G06F 21/6254* (2013.01); *G06F 16/337* (2019.01); *G06F 16/951* (2019.01); *G06F 21/316* (2013.01); *G06F 21/6263* (2013.01)

(58) Field of Classification Search
CPC . G06F 21/6254; G06F 16/951; G06F 21/6263
See application file for complete search history.

(56) References Cited

U.S. PATENT DOCUMENTS

| 7,155,427 B1* | 12/2006 | Prothia ................. G06F 16/284 |
| | | 707/694 |
| 9,043,250 B2 | 5/2015 | Ling et al. |
| 9,705,908 B1 | 7/2017 | Thakurta et al. |
| 2007/0239982 A1 | 10/2007 | Aggarwal et al. |
| 2008/0172374 A1* | 7/2008 | Wolosin ............. G06F 16/9537 |
| 2010/0138370 A1* | 6/2010 | Wu ........................ G06Q 30/02 |
| | | 706/12 |
| 2013/0014270 A1 | 1/2013 | Sy et al. |
| 2014/0359782 A1 | 12/2014 | Golic |
| 2015/0324434 A1* | 11/2015 | Greenwood ............. G06N 5/04 |
| | | 707/722 |
| 2016/0034714 A1 | 2/2016 | Cuthbertson |
| 2016/0365974 A1 | 12/2016 | Cardno et al. |

(Continued)

OTHER PUBLICATIONS

Bakken et al., "Data obfuscation: Anonymity and desensitization of usable data sets," IEEE Security & Privacy 2.6 (2004): 34-41.

(Continued)

*Primary Examiner* — Mohammad A Siddiqi
(74) *Attorney, Agent, or Firm* — Anthony Curro; Ryan, Mason & Lewis, LLP

(57) ABSTRACT

A method for neutralizing a pattern of user activity, comprises collecting data corresponding to the user activity, generating a user distribution over a domain comprising a plurality of respective elements based on the collected data, determining a transformation function to neutralize the user distribution, and applying the transformation function to neutralize the user distribution.

20 Claims, 12 Drawing Sheets

(56) References Cited

U.S. PATENT DOCUMENTS

2016/0371340 A1* 12/2016 Waltermann ........ G06F 16/9537
2017/0132759 A1*  5/2017 Perez Pellitero ........ G06K 9/42
2018/0241829 A1*  8/2018 Edwards ................ H04L 67/22

OTHER PUBLICATIONS

Howe et al., "TrackMeNot: Resisting surveillance in web search," Lessons from the Identity Trail: Anonymity, Privacy, and Identity in a Networked Society 23 (2009): 417-436.
Mivule, "Utilizing noise addition for data privacy, an overview," arXiv preprint arXiv: 1309-3958 (2013).
Torra et al., "Data privacy," Wiley Interdisciplinary Reveiws: Data Mining and Knowledge Discovery 4.4 (2014): 269-280.
Widrow et al., "Adaptive noise cancelling: Principles and applications," Proceedings of the IEEE 63.12 (1975): 1692-1716.

\* cited by examiner

DETECTED PATTERN

ESTIMATED MATHEMATICAL
TRANSFORMATION FUNCTION FOR NEUTRALIZATION

NEUTRALIZED FREQUENCY DISTRIBUTION

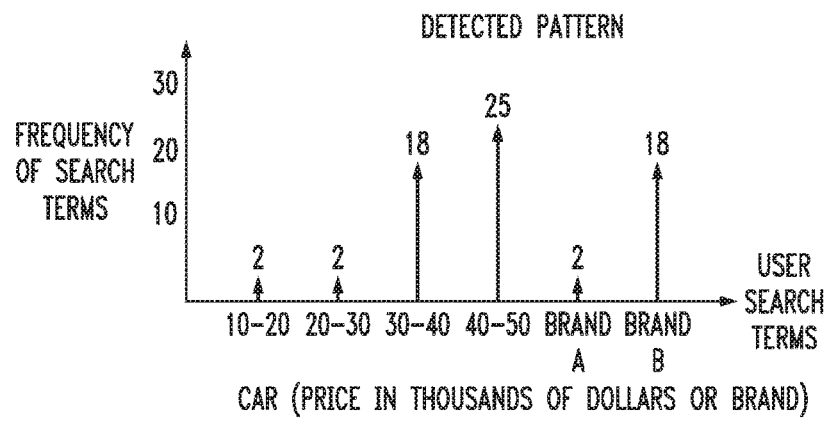
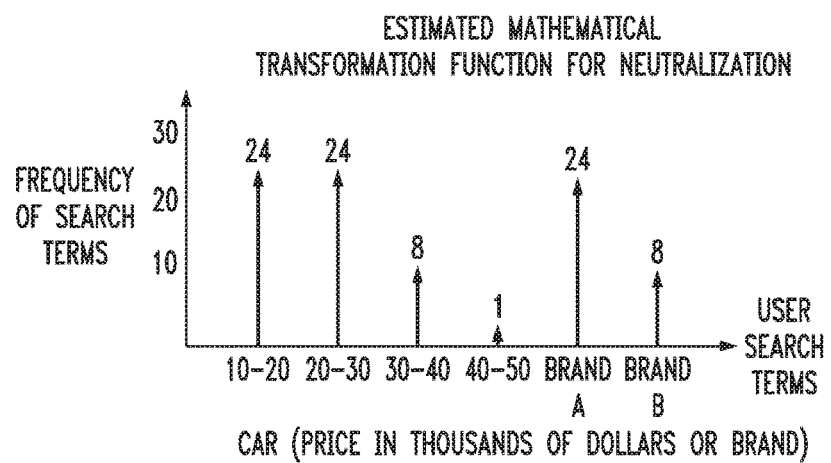
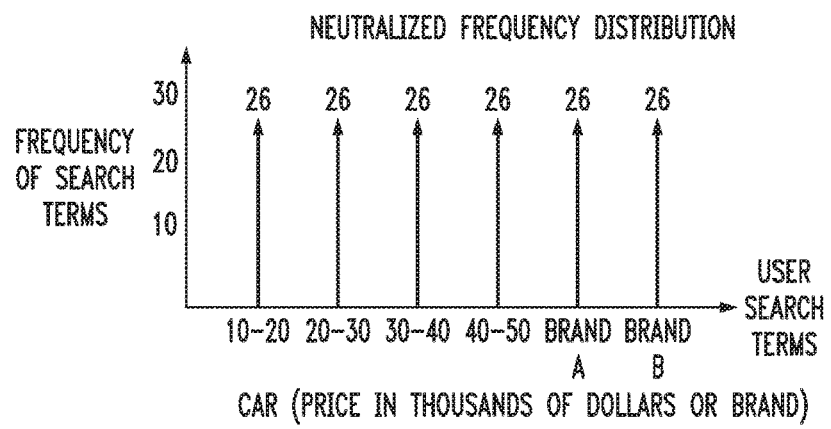

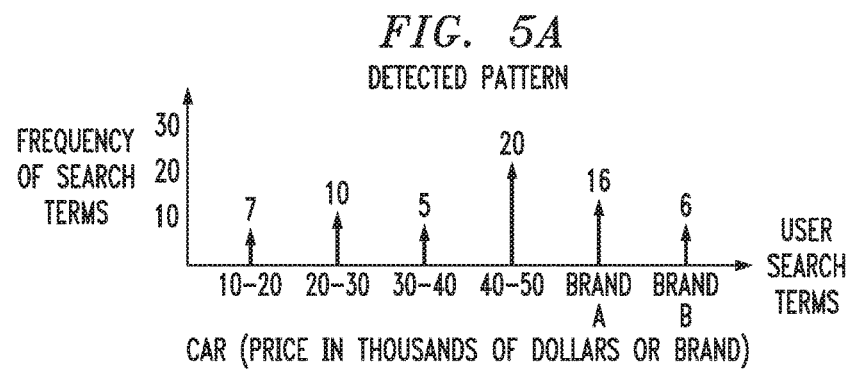
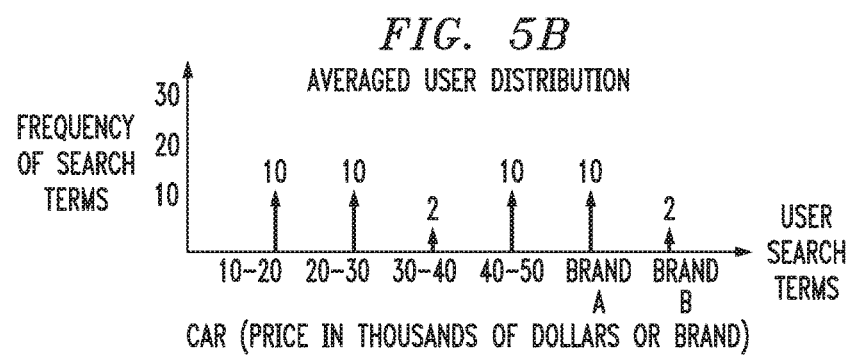
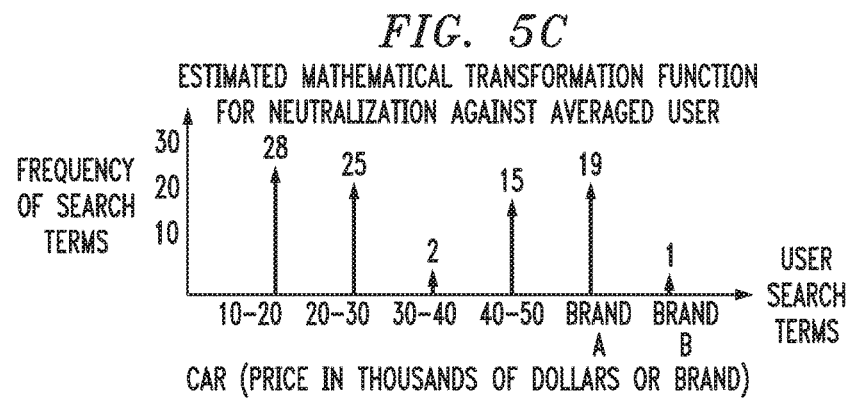
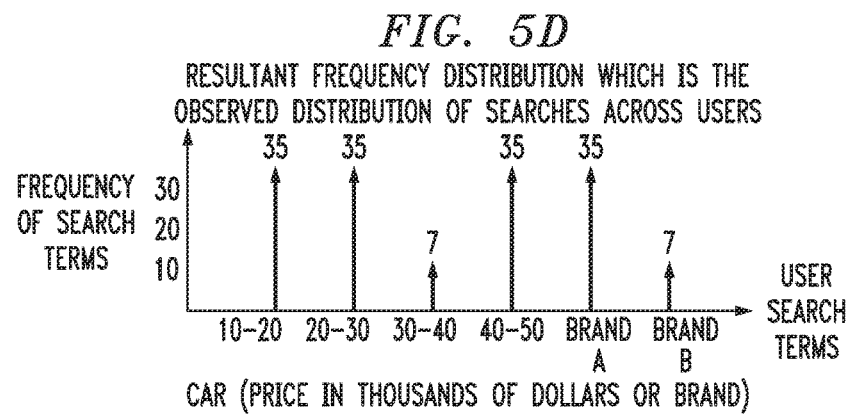

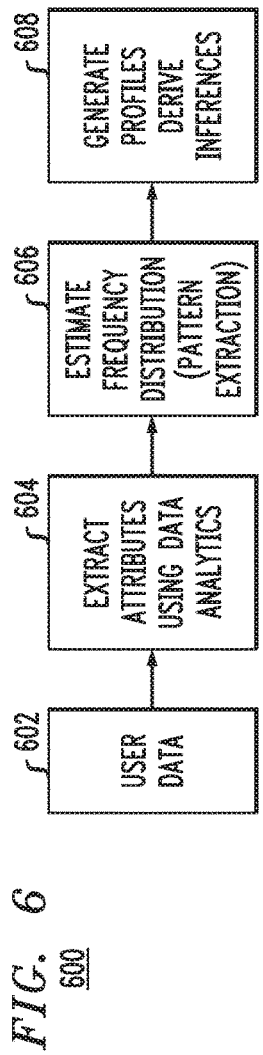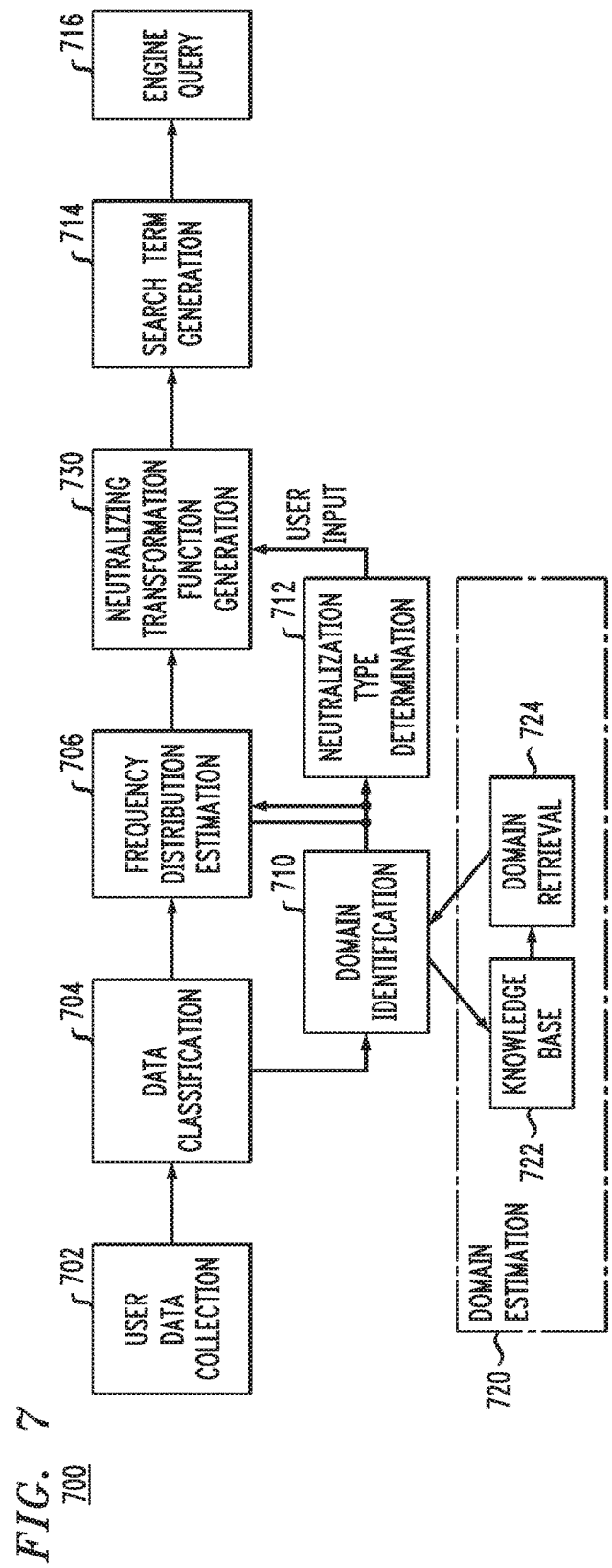

DEAR USER. BASED ON YOUR SEARCH TERMS, THE FOLLOWING PATTERN IS DETECTED. CHOOSE THE RIGHT OPTION TO PROCEED FURTHER

WITH THIS DISTRIBUTION, THE PROFILER CAN ESTIMATE YOUR SALARY

1. NEUTRALIZE TO UNIFORM DISTRIBUTION
2. NEUTRALIZE TO AVERAGED USER DISTRIBUTION
3. SHOW ME THE AVERAGED DISTRIBUTION TO DECIDE
4. DO NOT NEUTRALIZE

METHOD AND SYSTEM TO PREVENT INFERENCE OF PERSONAL INFORMATION USING PATTERN NEUTRALIZATION TECHNIQUES

BACKGROUND

Electronic means may be used to profile and infer personal information about individuals. For example, inferences about one or more individuals can be made through analysis of individual data records. For example, by analyzing a short message service (SMS) correspondence about a salary, the salary of the individual can be profiled. By analyzing social media activity, individual connections, age, marital status, etc. can be profiled. Further, inferences about a person can be made based on a relative frequency of usage of terms or entities by the individual in, for example, search engines. For example, by analyzing the frequency of search terms, appropriate recommendations can be made corresponding to what is believed to be an individual's needs, likes or dislikes. By way of example, if an individual is searching more about 4 and 5 star hotels than lower rated properties, a recommendation engine may infer personal details, such as the individual's wealth and salary.

Although this information can be used to profile users for positive results, such as recommendations, it might be against individual interest to profile certain personal information about a user, especially if the inferred personal information can be used for negative purposes, such as, for example, identity theft.

SUMMARY

According to an exemplary embodiment of the present invention, a method for neutralizing a pattern of user activity, comprises collecting data corresponding to the user activity, generating a user distribution over a domain comprising a plurality of respective elements based on the collected data, determining a transformation function to neutralize the user distribution, and applying the transformation function to neutralize the user distribution.

According to an exemplary embodiment of the present invention, a system for neutralizing a pattern of user activity comprises a memory and at least one processor coupled to the memory, wherein the at least one processor is configured to collect data corresponding to the user activity, generate a user distribution over a domain comprising a plurality of respective elements based on the collected data, determine a transformation function to neutralize the user distribution, and apply the transformation function to neutralize the user distribution.

According to an exemplary embodiment of the present invention, a computer program product for neutralizing a pattern of user activity comprises a computer readable storage medium having program instructions embodied therewith, the program instructions executable by a processor to cause the processor to perform a method comprising collecting data corresponding to the user activity, generating a user distribution over a domain comprising a plurality of respective elements based on the collected data, determining a transformation function to neutralize the user distribution, and applying the transformation function to neutralize the user distribution.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIGS. 2A-2C are graphs illustrating steps for neutralizing a pattern of user activity in connection with a second example, according to an exemplary embodiment of the present invention.

FIGS. 5A-5D are graphs illustrating steps for neutralizing a pattern of user activity based on transforming an individual user search distribution to a search distribution averaged across multiple users in connection with the second example, according to an exemplary embodiment of the present invention.

FIG. 6 is a block diagram illustrating a process for user profiling, according to an exemplary embodiment of the present invention.

FIG. 7 is block diagram illustrating a system for neutralizing a pattern of user activity, according to an exemplary embodiment of the present invention.

DETAILED DESCRIPTION

Exemplary embodiments of the invention will now be discussed in further detail with regard to prevention of user-profile inferences based on user activity and, in particular, to estimating a neutralizing transformation function to neutralize a user data distribution. This invention may, however, be embodied in many different forms and should not be construed as limited to the embodiments set forth herein.

Embodiments of the current invention disclose a neutralizing framework to automatically remove the traces of patterns left by the user as result of electronic activity including, but not necessarily limited to, search engine, social media, email, messaging, and/or global positioning system (GPS) activity. In accordance with an embodiment of the present invention, a pattern of user activity is neutralized to a uniform distribution so that a profiler does not learn anything about the user. For example, a uniform distribution over entities communicates that a user is equally interested in all the entities, which would likely not be useful to a profiler, whereas a profiler would likely be interested if a user is, for example, more focused on topic A relative to topic B, so that recommendations and inferences can be made based on the user's higher interest in topic A.

The framework can be user friendly to allow a user to customize the patterns that a user wants discoverable or neutralized based on the user's preferences. For example, a user might be interested in allowing certain patterns to be discoverable by certain pattern recognition engines associated with particular applications in order to get correct recommendations, but may want other patterns obfuscated or removed to prevent unwanted activity, such as identity theft. Furthermore, users may not want certain applications to infer their personal information.

Embodiments of the present invention can be configured to produce modified (also referred to herein as "neutralized") search results that, when received by a potentially harmful entity, do not reveal any patterns from which personal information may be inferred. Accordingly, a proper search based on the search terms can be captured and performed by a search engine on behalf of an individual, but is modified before to remove patterns of personal preferences before being analyzed by potentially undesirable sources.

Embodiments of the present invention address the issue that user search terms and/or entries in connection with applications other than search engines are sent to and captured at a server and that there is typically no user control on the data stored at the server. Accordingly, in general, a user can only add more impressions, but cannot delete or encrypt the impressions.

Figure 1A:
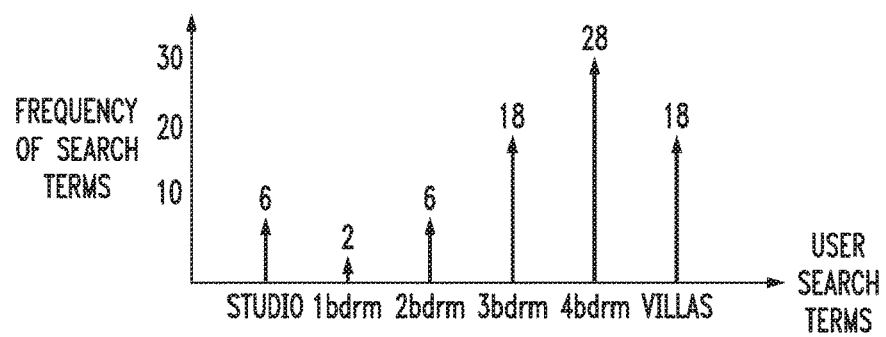
FIGS. 1A-1C are graphs illustrating steps for neutralizing a pattern of user activity in connection with a first example, according to an exemplary embodiment of the present invention.
Figure 1B:
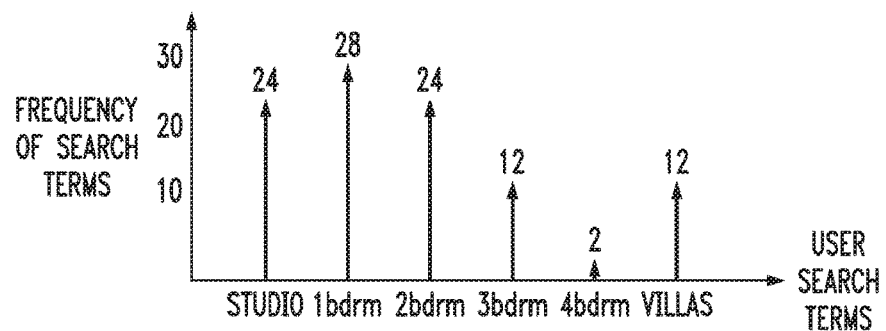
Figure 1C:
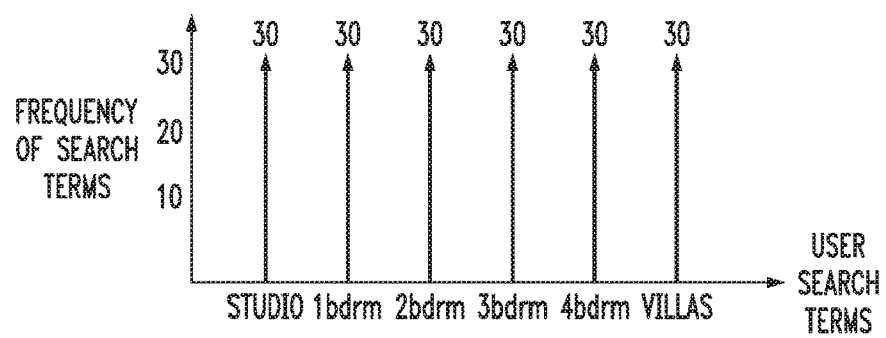

FIGS. 1A-1C are graphs illustrating steps for neutralizing a pattern of user activity in connection with a first example, according to an exemplary embodiment of the present invention. The graphs plot the frequency of search terms by a user (e.g., number of times a user included the term in searches) over a given time period T. FIGS. 1A-1C are related to a first example, which corresponds to searches for real estate, hence the search terms "Studio", "1bdrm" (bedroom), "2bdrm", "3bdrm", "4bdrm" and "Villas". The search terms illustrated in FIGS. 1A-1C are by way of example and used for illustrative purposes to describe the embodiments of the present invention. The embodiments of the invention are not limited the examples discussed herein, and may be used in connection with various types of searches and search terms.

FIG. 1A is a graph illustrating a detected pattern of frequency of search terms by a user in connection with the first example. More specifically, a system in accordance with an embodiment of the present invention automatically detects activity by a user (e.g., on an Internet search engine) in connection with performing searches over a time period T. The time period T can vary based on how long a user spends searching and/or time constraints programmed into software used in connection with execution of the embodiments of the present invention. Based on the user activity, the system determines a user distribution of search terms for the time period T. The distribution is determined over a domain of terms for a topic. For example, a domain for a topic of real estate could be {1bdrm, 2bdrm, 3bdrm, flat, row house, villa, apartment, and so on}.

In accordance with an embodiment of the present invention, based on, for example, programmed instructions and/or one or more machine learning techniques using, for example, historical results, the system is configured automatically determine the topic, and a domain including relevant search terms from a collection of searches performed by a user. Machine learning techniques may include, but are not necessarily limited to, a Support Vector Machine (SVM), a Multilayer Perceptron (MLT), a deep learning model and a neural network.

Using the searches performed by a user as input, the system provides the user distribution of search terms over the time period T. For example, as shown in FIG. 1A, there is a low frequency (close to zero) of the search terms "Studio", "1bdrm" and "2bdrm". There are higher frequencies of the search terms (e.g., 20 and 30) "3bdrm", "4bdrm" and "Villas" from which, for example, a need for more space, a larger family and/or greater wealth, may be inferred. The frequency of search terms can represent an accounting by the system of actual occurrences of the terms in searches by a user over the time period T, or an estimate of frequency of search terms determined by the system based on a sampling of searches performed by a given user over a time period T. The estimation can be performed using, for example, extrapolation algorithms programmed into the system or learned by the system in accordance with one or more embodiments of the present invention.

FIG. 1B is a graph illustrating an estimated mathematical transformation function for neutralizing a pattern of user activity, according to an exemplary embodiment of the present invention. For example, the system calculates a neutralizing transformation function to transform the user distribution (e.g., FIG. 1A) to a uniform distribution (e.g., FIG. 1C). For example, the neutralizing transformation function essentially determines which and a number of the search terms/entities to be generated to result in a uniform user distribution. As such, the mathematical transformation function must specify an appropriate number of respective search terms to be generated in order to balance the distribution so that no inferences about user preferences can be made. For example, referring to FIGS. 1A-1C, the values of the frequencies of the search terms in the domain in FIG. 1B, when added to the values of the frequencies of the search terms in the domain in FIG. 1A result in the uniform distribution of FIG. 1C, with equal values of the frequencies of the search terms in the domain (30 in this non-limiting example). The values of the frequencies of the search terms in the domain in FIG. 1B are determined to result in the uniform distribution of FIG. 1C.

A possible algorithm for calculating the neutralizing transformation function can include, but is not limited to, the following formula (1):

$$\text{alpha}+(\max(\text{Entity}(\text{Value}))-\text{Entity}\_i(\text{Value})) \quad (1)$$

where Entity is the search term (in the first example, "Studio", "1bdrm", "2bdrm", "3bdrm", "4bdrm" and "Villas"), Entity_i is the ith entity, where i is an integer and alpha is a constant value randomly selected by the system.

In a non-limiting illustrative example, if the frequency of 1bdrm is 5, 2bdrm is 3, 3bdrm is 5, and 4bdrm is 30, and alpha is 2, then the neutralization transformation function is given as:

for 1bdrm: alpha+(max(Entity(Value))−Entity_i(Value))=2+max(5,3,5,30)−5=2+30−5=27 for 2bdrm: alpha+(max(Entity(Value))−Entity_i(Value))=2+max(5,3,5,30)−3=2+30−3=29 for 3bdrm: alpha+(max(Entity(Value))−Entity_i(Value))=2+max(5,3,5,30)−5=2+30−5=27 for 4bdrm: alpha+(max(Entity(Value))−Entity_i(Value))=2+max(5,3,5,30)−30=2+30−30=2

The preceding algorithm represents one example algorithm according to an embodiment of the present invention. Other functions (instead of a random function) over the alpha generation can also be defined for neutralizing the user distribution.

FIG. 1C is a graph illustrating a neutralized frequency distribution, according to an exemplary embodiment of the present invention. For example, based on the neutralizing transformation function, an appropriate number of search terms are generated to make the distribution uniform. As shown in FIG. 1C, the frequency of all of the search terms is the same so that a profiler does not learn anything about the user, and the distribution is not useful to a profiler. In accordance with the neutralized frequency distribution, the system automatically generates dummy (neutralizing) search terms as guided by the neutralizing transformation function. With user permission, the generated search terms are transmitted to the search engine so that they may be discoverable by a profiler and result in the profiler receiving the uniform distribution. The search terms are incorporated into the search engine in a manner (e.g., in a background) such that, on the user end, the user's actual search results are not modified, and the user is able to conduct searches in a normal manner. For example, in accordance with an embodiment of the present invention, there is an interface between a user and a search engine. The user provides a query to the interface. A process running in a background of the interface generates additional queries using fake/neutralizing terms related to the actual query topic, and randomly arranges the terms, including those of the user query. The interface runs the search of these queries over the actual search engine, obtains the results of the queries, and displays the desired query result, which is based on the user query and not the additional queries, only to the user. However, the profiler that may be monitoring the search results, receives an output based on the neutralized, not the original user distribution.

In accordance with an embodiment of the present invention, the user distribution of FIG. 1A is generated after a time period T during which searching has been performed by a user. Alternatively, a distribution can be generated as soon as a user begins to input the search terms. In this alternative approach, the distribution and corresponding mathematical transformation function and neutralized distribution may be continuously modified by the system as the user continues to search, and the scope of the search evolves or is modified.

Although embodiments of the present invention discuss the distributions and transformation functions in connection with search terms and search engines, the embodiments of the present invention are not necessarily limited thereto. For example, embodiments of the present invention can be used in connection with messages, social media posts, comments, emails, etc., from which a distribution of terms related to particular topics may be determined and used for profiling of a user's preferences and/or characteristics. In that case, systems and methods of the embodiments of the present invention may neutralize user's distribution of terms in these mediums (e.g., messages, social media posts, comments, emails, etc.) in a similar manner in the background so that a user's actual activity is not modified, and the user is able to conduct activities in a normal manner, but a profiler that may be monitoring the user's activity, receives an output based on the neutralized, not the original user distribution.

FIGS. 2A-2C are graphs illustrating steps for neutralizing a pattern of user activity in connection with a second example, according to an exemplary embodiment of the present invention. The graphs of FIGS. 2A-2C are similar to those of FIGS. 1A-1C, except that FIGS. 2A-2C are based on a different second example, which corresponds to searches for cars based on their cost and brand (e.g., make). Like FIGS. 1A-1C, the graphs of FIGS. 2A-2C plot the frequency of search terms by a user (e.g., number of times a user included the term in searches) over a given time period T. As noted, FIGS. 2A-2C are related searches for cars based on cost (thousands of dollars) and brand, hence the search terms "10-20", "20-30", "30-40", "40-50", "Brand A" (e.g., known car make) and "Brand B" (e.g., another known car make). The search terms illustrated in FIGS. 2A-2C are by way of example and used for illustrative purposes to describe the embodiments of the present invention. As noted above, the embodiments of the invention are not limited the examples discussed herein, and may be used in connection with various types of searches and search terms.

Like FIGS. 1A-1C, respectively, FIG. 2A is a graph illustrating a detected pattern of frequency of search terms by a user, FIG. 2B is a graph illustrating an estimated mathematical transformation function for neutralizing a pattern of user activity and FIG. 2C is a graph illustrating a neutralized frequency distribution, in connection with the second example. With the exception that FIGS. 2A-2C are related to the second example, the details of FIGS. 2A-2C are similar to those of FIGS. 1A-1C and a detailed discussion of same is not included herein since it would be repetitious.

Figure 3A:
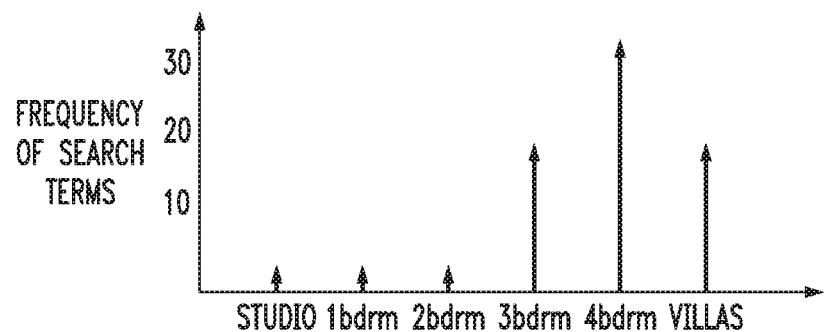
FIGS. 3A-3B are graphs respectively illustrating an individual user search distribution and a search distribution averaged across multiple users, according to an exemplary embodiment of the present invention.
Figure 3B:
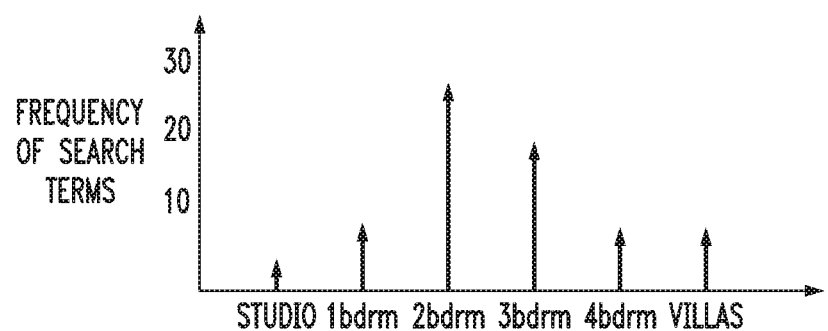

FIGS. 3A-3B are graphs respectively illustrating an individual user search distribution and a search distribution averaged across multiple users, according to an exemplary embodiment of the present invention. Referring to FIGS. 3A and 3B, along with user's distribution, a profiler may maintain a distribution of search terms across all users. Such distributions averaged over all users, as shown by FIG. 3B, can be useful for identifying anomaly users by comparing individual user distributions, such as what is shown in FIG. 3A, with the average distribution, such as what is shown in FIG. 3B.

Neutralizing a user specific distribution to a uniform distribution may make the user an anomaly user, when compared to the averaged distribution. Accordingly, embodiments of the present invention provide an option to neutralize with respect to the individual data distribution or an averaged user distribution. User specific distributions herein may be referred to herein as "user distributions", and the distributions determined by averaging data over a plurality of users (e.g., all users) may be referred to herein as "averaged distribution". Referring to FIGS. 3A and 3B, there are differences between the user and averaged distributions, especially with respect to searches for 2 and 4 bedroom dwellings.

Figure 4A:
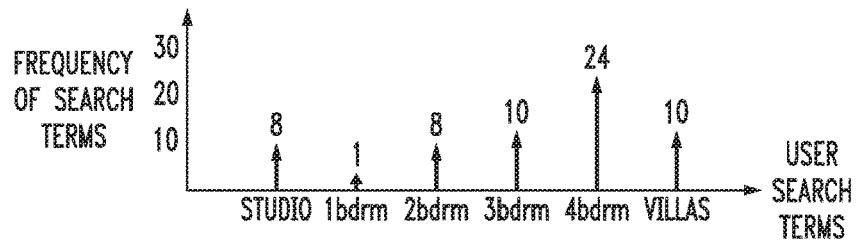
FIGS. 4A-4D are graphs illustrating steps for neutralizing a pattern of user activity based on transforming an individual user search distribution to a search distribution averaged across multiple users in connection with the first example, according to an exemplary embodiment of the present invention.

FIGS. 4A-4D are graphs illustrating steps for neutralizing a pattern of user activity based on transforming an individual user search distribution to a search distribution averaged across multiple users in connection with the first example, according to an exemplary embodiment of the present invention. Like FIG. 1A, FIG. 4A is a graph illustrating a detected pattern of frequency of search terms by a user, in connection with the first example. Details of the graph of FIG. 4A are similar to those discussed in connection with FIGS. 1A and 2A.

Figure 4B:
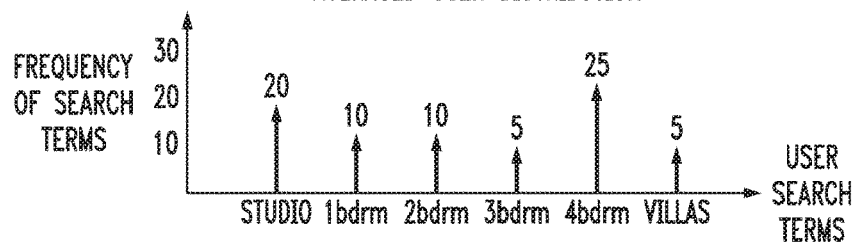
Figure 4C:
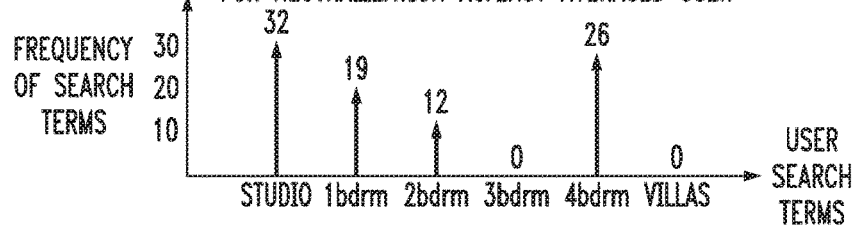

FIG. 4B is a graph illustrating a search distribution averaged across multiple users in connection with the first example. FIG. 4C is a graph of an estimated mathematical transformation function for neutralizing a pattern of user activity based on an averaged user distribution (i.e., averaged user distribution in FIG. 4B) instead of a uniform distribution. A possible algorithm for calculating the neutralizing transformation function can include the following, but is not limited thereto.

For example, assume that the frequencies for a user distribution are: 1bdrm=2, 2bdrm=1, 3bdrm=15, and 4bdrm=20, for averaged user distribution are: 1bdrm=5, 2bdrm=3, 3bdrm=5, and 4bdrm=30. A first step is to calculate ratios of the averaged user distribution as follows: ratio freq(1bdrm, 2bdrm)=5/3, ratio freq(2bdrm, 3bdrm)=3/5, ratio freq(3bdrm, 4bdrm)=5/30=1/6 . . . and all possible pair wise combinations (e.g., ratio freq(1bdrm, 3bdrm), ratio freq(1bdrm, 4bdrm), ratio freq(2bdrm, 4bdrm), ratio freq (2bdrm, 1bdrm), etc.). Then, determine the transformation function of the user distribution which results in the ratios of the averaged user distribution pattern. This transformation function is illustrated by the graph in FIG. 4C.

Figure 4D:
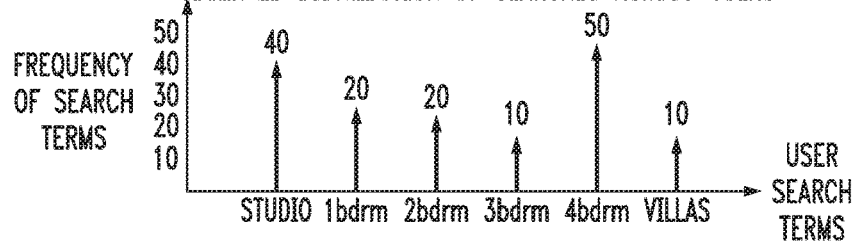

FIG. 4D is a graph illustrating a resultant neutralized frequency distribution of the user distribution based on the observed distribution of searches (averaged distribution) across multiple (e.g., all) users. Accordingly, the neutralized frequency distribution is not based on a uniform distribution, but instead conforms to the averaged user distribution. As can be seen in FIG. 4D, although the magnitudes of the frequencies may differ from those in FIG. 4B, the overall ratios between the different search terms of the domain are the same (e.g., 2:1 between Studio and 1bdrm, 1:1 between 1 and 2bdrm, 2:1 between 2 and 3bdrm, 1:5 between 3 and 4bdrm, 5:1 between 4 and 5bdrm, etc.).

In accordance with the neutralized frequency distribution, the system automatically generates dummy (neutralizing) search terms as guided by the neutralizing transformation function. With user permission, the generated search terms are transmitted to the search engine so that they may be discoverable by a profiler and result in the profiler receiving the resultant neutralized frequency distribution. The search terms are incorporated into the search engine in a manner (e.g., in a background) such that, on the user end, the user's actual search results are not modified, and the user is able to conduct searches in a normal manner. However, the profiler that may be monitoring the search results, receives an output based on the neutralized, not the original user distribution.

FIGS. 5A-5D are graphs illustrating steps for neutralizing a pattern of user activity based on transforming an individual user search distribution to a search distribution averaged across multiple users in connection with the second example, according to an exemplary embodiment of the present invention. The graphs of FIGS. 5A-5D are similar to those of FIGS. 4A-4D, except that FIGS. 5A-5D are based on the second example, which corresponds to searches for cars based on their cost and brand. Like FIGS. 4A-4D, respectively, FIG. 5A is a graph illustrating a detected pattern of frequency of search terms by a user, FIG. 5B is a graph illustrating a search distribution averaged across multiple users, FIG. 5C is a graph of an estimated mathematical transformation function for neutralizing a pattern of user activity based on an averaged user distribution instead of a uniform distribution, and FIG. 5D is a graph illustrating a resultant neutralized frequency distribution of the user distribution based on the observed distribution of searches (averaged distribution) across multiple (e.g., all) users, in connection with the second example. With the exception that FIGS. 5A-5D are related to the second example, the details of FIGS. 5A-5D are similar to those of FIGS. 4A-4D and a detailed discussion of same is not included herein since it would be repetitious.

FIG. 6 is a block diagram illustrating a process for user profiling, according to an exemplary embodiment of the present invention. Referring to FIG. 6, a process for user profiling 600 includes electronically receiving or pulling user data 602, which can include, for example, user information including, but not necessarily limited to, location, device identifiers, searches performed, and search results. Then, at block 604, data analytics is used to extract attributes from the user data. Data analytics may include qualitative and quantitative techniques and processes used to extract and categorize data in order to identify and analyze data and patterns. For example, the search data, including expressions, phrases and terms used in the user's search, is analyzed to determine a topic and a domain of relevant search terms which are associated with the topic and will be used in the frequency distribution. The frequency of use of the search terms by one or more users in searches is analyzed to generate the user and averaged user distributions. As noted above, based on, for example, programmed instructions and/or one or more machine learning techniques using, for example, historical results, the system is configured automatically determine the topic and domain of relevant search terms from a collection of searches performed by one or more users.

Then, at block 606, the frequency distribution is estimated and the frequency distribution pattern, as illustrated in, for example, the graphs of FIGS. 1A, 2A, 3A, 3B, 4A and 5A, is extracted. As noted above, the frequency of search terms can represent an accounting by the system of actual occurrences of the terms in searches over a time period, or an estimate of frequency of search terms determined by the system based on a sampling of searches performed over a time period. The estimation can be performed using, for example, extrapolation algorithms programmed into or learned by the system. Then, at block 608, profiles of users can be generated based on derived inferences of user characteristics and preferences obtained from the frequency distribution of search terms.

FIG. 7 is block diagram illustrating a system for neutralizing a pattern of user activity, according to an exemplary embodiment of the present invention. As shown in FIG. 7 by lines and/or arrows, the components of the system 700 are operatively connected to each other via, for example, physical connections, such as wired and/or direct electrical contact connections, and/or wireless connections, such as, for example, WiFi, BLUETOOTH, IEEE 802.11, and/or networks, including but not limited to, a local area network (LAN), wide area network (WAN), cellular network, ad hoc networks, WANET, satellite network or the Internet. For example, a network can operatively link one or more components 702, 704, 706, 710, 712, 714, 716, 720 and 730 of the system 700.

By way of non-limiting example, in accordance with an embodiment of the present invention, referring to FIG. 7, the system 700 includes a user data collection component 702, data classification component 704 and frequency distribution estimation component 706. The components 702, 704 and 706 perform functions described in connection with blocks 602, 604 and 606 of FIG. 6. The user data collection component 702 electronically receives or electronically pulls user data, for example, over one or more network. The data classification component 704 uses data analytics to extract attributes from the user data, such as topics, and domains of relevant search terms which are associated with the topics, and the frequency of use of the search terms by one or more users in searches. The data classification component 704 can be linked to a domain identification component 710 which can be used to identify the domains for each topic, such as, for example, {studio, 1bdrm, 2bdrm, 3bdrm, etc.} for real estate, and different makes and models as a domain for vehicles. A domain identification component 710 is linked a domain estimation component 720 including a knowledge base 722 (e.g., database) and domain retrieval component 724. In connection with the domain identification, a knowledge base 722 of previously assigned domains based on prior analysis of topics and associated search terms and results can be accessed by the domain retrieval component 724 to determine if there are any domains which match with current topics. The domains in the knowledge base associated with the same or most similar topics can be assigned to one or more topics by the domain identification component 710 as the domains to be considered in connection with a particular set of frequency distributions. The knowledge base 722 can continue to be populated using, for example, machine learning techniques, as additional domains are identified. The frequency distribution estimation component 706 estimates the frequency distribution and extracts the frequency distribution pattern, as illustrated in, for example, the graphs of FIGS. 1A, 2A, 3A, 3B, 4A and 5A.

Figure 8:
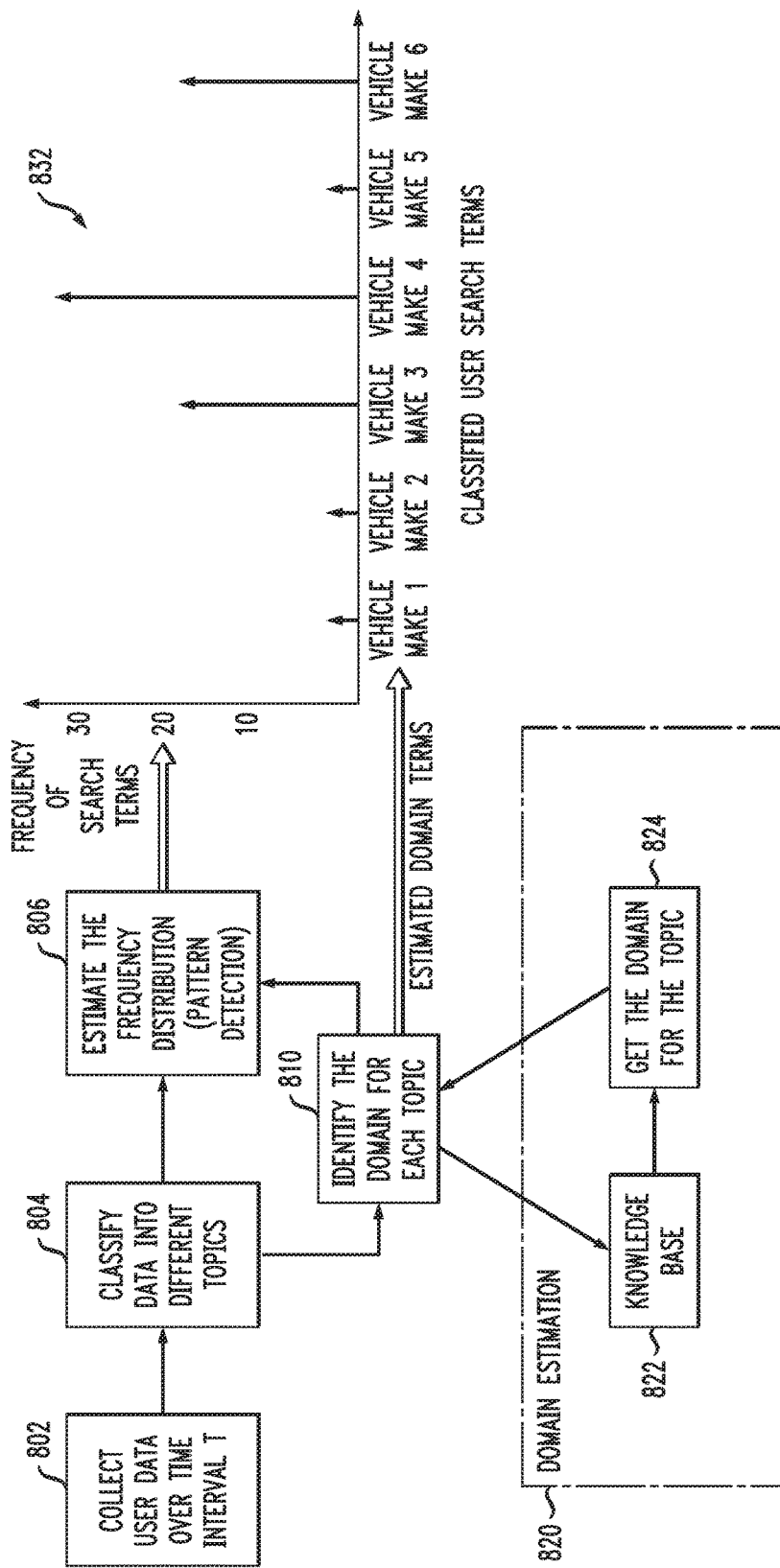
FIG. 8 is a block diagram illustrating a process for detecting for the existence of a pattern, according to an exemplary embodiment of the present invention.

Referring to FIG. 8, which is a block diagram illustrating a process for detecting for the existence of a pattern, according to an exemplary embodiment of the present invention, based upon user data having been collected (block 802), data being classified into different topics (block 804), and domains being identified for each topic (block 810) as described above, the frequency distribution pattern is estimated (block 806) and the domain terms for the frequency distribution pattern are provided through the domain identification component 710. As shown in FIG. 8 in a non-limiting illustrative example, a graph 832 illustrates a detected pattern of frequency of search terms by a user. The graph relates to the topic of vehicles and includes a domain of makes for vehicles 1, 2, 3, 4, 5 and 6. The frequency of search terms in the domain is plotted for each search term in the domain. As explained above, the domain estimation 820 can be performed by obtaining the domain for a topic from a knowledge base.

Figure 9:
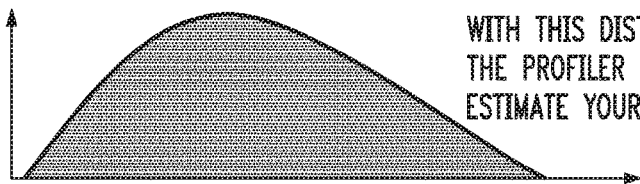
FIG. 9 illustrates a user interface for providing options for neutralizing a pattern, according to an exemplary embodiment of the present invention.

Referring to FIGS. 7 and 9, in accordance with an embodiment of the present invention, a neutralization type determination component 712 generates an interface 913, which seeks user input as to whether and what type of neutralization a user wants to perform. For example, a user may be presented with an interface 913 which includes the frequency distribution pattern generated by the frequency distribution estimation component 706 along with a determination that has been made by the neutralization type determination component 712. The determination may indicate what inferences may be made by a profiler about the user based on the search terms and the pattern. The user can also be presented with options to choose whether to neutralize, and if so, decide to neutralize based on a uniform or averaged user distribution. The interface 913 may further provide the user with an option to view the averaged user distribution to help the user decide which neutralization type to use. In accordance with an embodiment of the present invention, a uniform neutralization pattern can be the default selection over the averaged user distribution, or vice versa. The neutralization type determination component 712 provides the selection of the neutralization type (e.g., user input from the interface 913) to the neutralizing transformation function generation component 730 so that the neutralizing transformation function based on the appropriate neutralization type can be generated.

Figure 10:
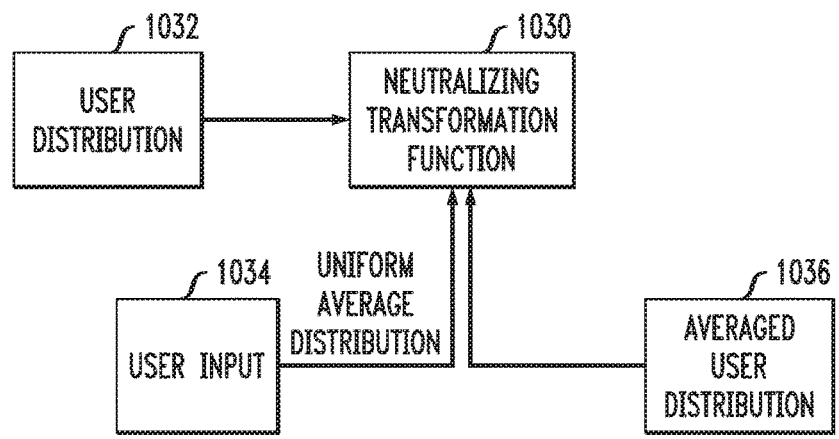
FIG. 10 is a block diagram illustrating a process for estimating a neutralizing transformation function, according to an exemplary embodiment of the present invention.

FIG. 10 is a block diagram illustrating a process for estimating a neutralizing transformation function, according to an exemplary embodiment of the present invention. Given the detected pattern (user distribution 1032), the neutralizing transformation function is generated by the neutralizing transformation function generation component 730 (FIG. 7) to convert the user distribution 1032 into a uniform or averaged neutralized distribution based on a user input 1034 determining which neutralizing distribution to generate. As described above, the averaged user distribution 1036 provides a basis for generating the averaged neutralized distribution.

Figure 11:
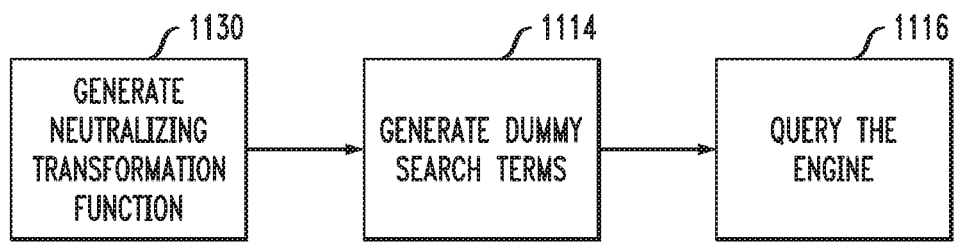
FIG. 11 is a block diagram illustrating a process for application of a neutralizing transformation function to data, according to an exemplary embodiment of the present invention.

FIG. 11 is a block diagram illustrating a process for application of a neutralizing transformation function to data, according to an exemplary embodiment of the present invention. Referring to FIG. 11, the neutralized frequency distribution is generated 1130, and based on the generated neutralized frequency distribution, the system automatically generates dummy (neutralizing) search terms 1114 as guided by the neutralizing transformation function. With user permission, the generated search terms are transmitted to the search engine in, for example, a query (block 1116) so that the search terms may be discoverable by a profiler and result in the profiler receiving the uniform or averaged distribution. The search terms are incorporated into the search engine in a manner (e.g., in a background) such that, on the user end, the user's actual search results are not modified, and the user is able to conduct searches in a normal manner. However, the profiler that may be monitoring the search results, receives an output based on the neutralized, not the original user distribution.

In accordance with an embodiment of the present invention, the system provides a user with an interface, and links the interface to existing search resources. As a result, instead of typing directly in the search engines (like YAHOO, GOOGLE, etc.), the user provides inputs to the interface of an embodiment of the present invention. Based on user input, the interface generates some keywords to neutralize the user's search pattern and query the actual server with those keywords in random fashion. As a result, a system, in accordance with an embodiment of the present invention, can fool a third part attacker, who will not know which is the dummy data and which is the real data.

Examples of neutralization pattern can include:
realData1 neutralizeData1 realData2 realData3 neutralizeData3 neutralizeData1 realData1 realData2 neutralizeData2 etc. . . .

Figure 12:
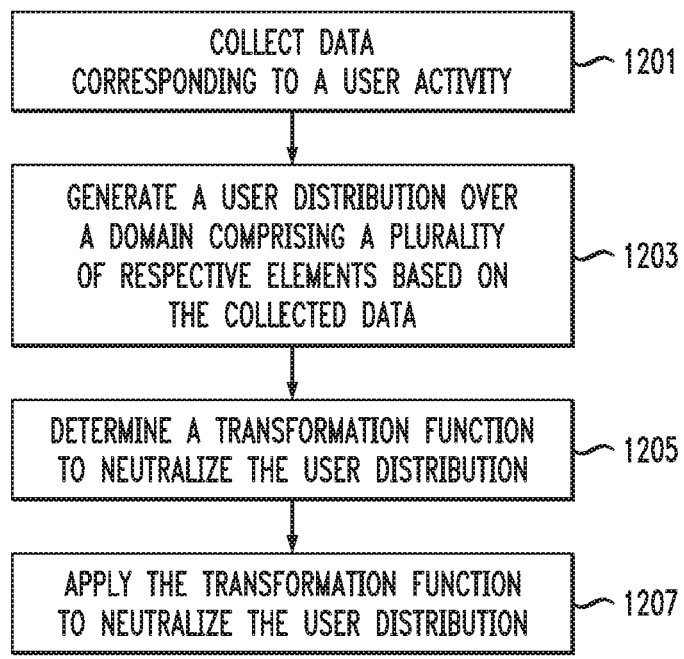
FIG. 12 is a flow diagram of a process for neutralizing a pattern of user activity, according to an exemplary embodiment of the invention.

FIG. 12 is a flow diagram of a process for neutralizing a pattern of user activity, according to an exemplary embodiment of the invention. Referring to FIG. 12, the process 1200 includes, at block 1201, collecting data corresponding to the user activity. The data may comprise terms used by a user in connection with performing a plurality of searches in a search engine. At block 1203, the process 1200 further comprises generating a user distribution over a domain comprising a plurality of respective elements based on the collected data, wherein the plurality of respective elements may comprise a plurality of search terms related to a topic. At blocks 1205 and 1207, the process 1200 further comprises determining a transformation function to neutralize the user distribution, and applying the transformation function to neutralize the user distribution. Applying the transformation function can comprise generating a plurality of neutralizing search terms, wherein the plurality of neutralizing search terms are applied to a background of the search engine.

The transformation function transforms the user distribution from a non-uniform distribution into a uniform distribution, or transforms the user distribution into a distribution based on an averaged distribution of a plurality of users. A user may be provided with an interface to determine whether the transformation function yields a transformed user distribution based on a uniform distribution or an averaged distribution of a plurality of users.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
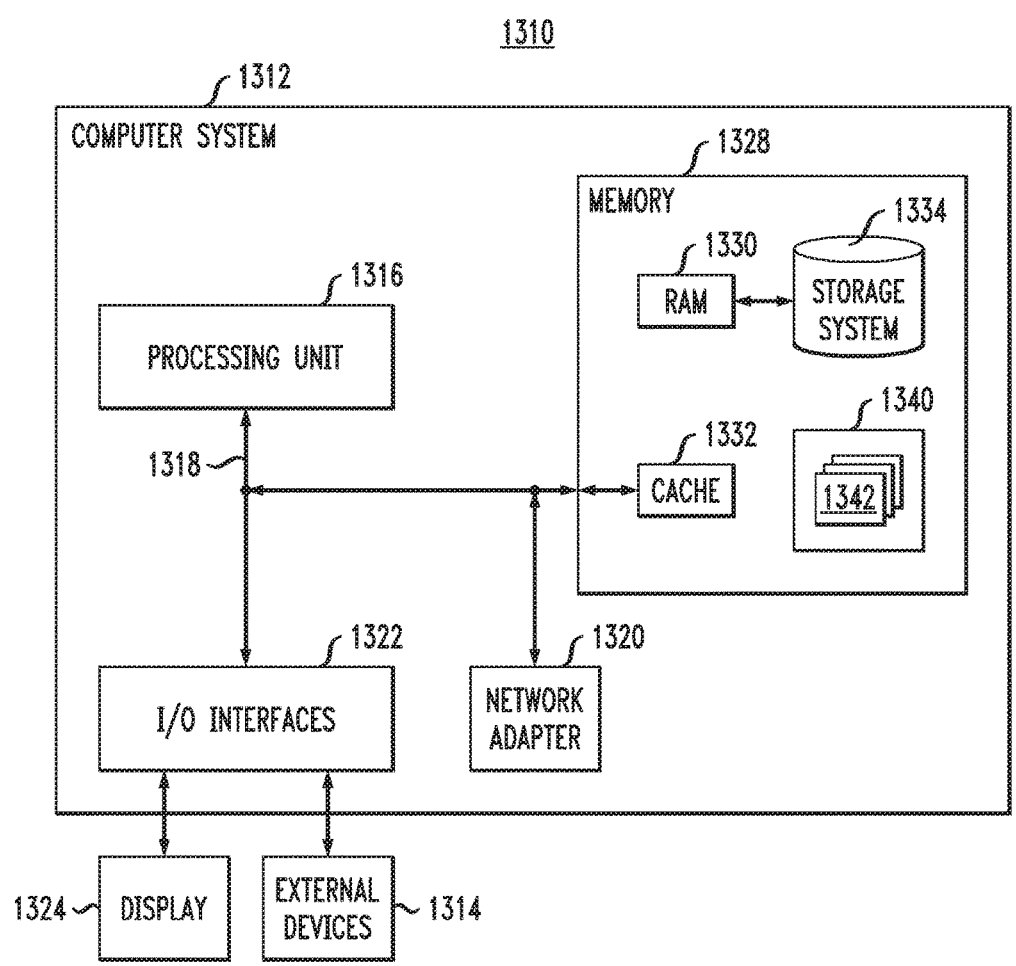
FIG. 13 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 13, in a computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network, in a distributed cloud computing environment, program modules may be located in both local and remote computer system storage media including memory storage devices.

As shown in FIG. 13, computer system/server 1312 in computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

The bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1312 typically includes a variety of computer system readable media. Such media may be any available media that is accessible by computer system/server 1312, and it includes both volatile and non-volatile media, removable and non-removable media.

The system memory 1328 can include computer system readable media in the form of volatile memory, such as random access memory (RAM) 1330 and/or cache memory 1332. The computer system/server 1312 may further include other removable/non-removable, volatile/nonvolatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1318 by one or more data media interfaces. As depicted and described herein, the memory 1328 may include at least one program product having a set (e.g., at least one) of program modules that are configured to carry out the functions of embodiments of the invention. A program/utility 1340, having a set (at least one) of program modules 1342, may be stored in memory 1328 by way of example, and not limitation, as well as an operating system, one or more application programs, other program modules, and program data. Each of the operating system one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc., one or more devices that enable a user to interact with computer system/server 1312, and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly control of select networking components host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 1310 in FIG. 13 can be an example of a cloud computing node. Computing node 1310 is only one example of a suitable cloud computing node and is not intended to suggest any limitation as to the scope of use or functionality of embodiments of the invention described herein. Regardless, computing node 1310 is capable of being implemented and/or performing any of the functionality set forth hereinabove. It is also to be understood that computing node 1310 is not necessarily a cloud computing node.

Figure 14:
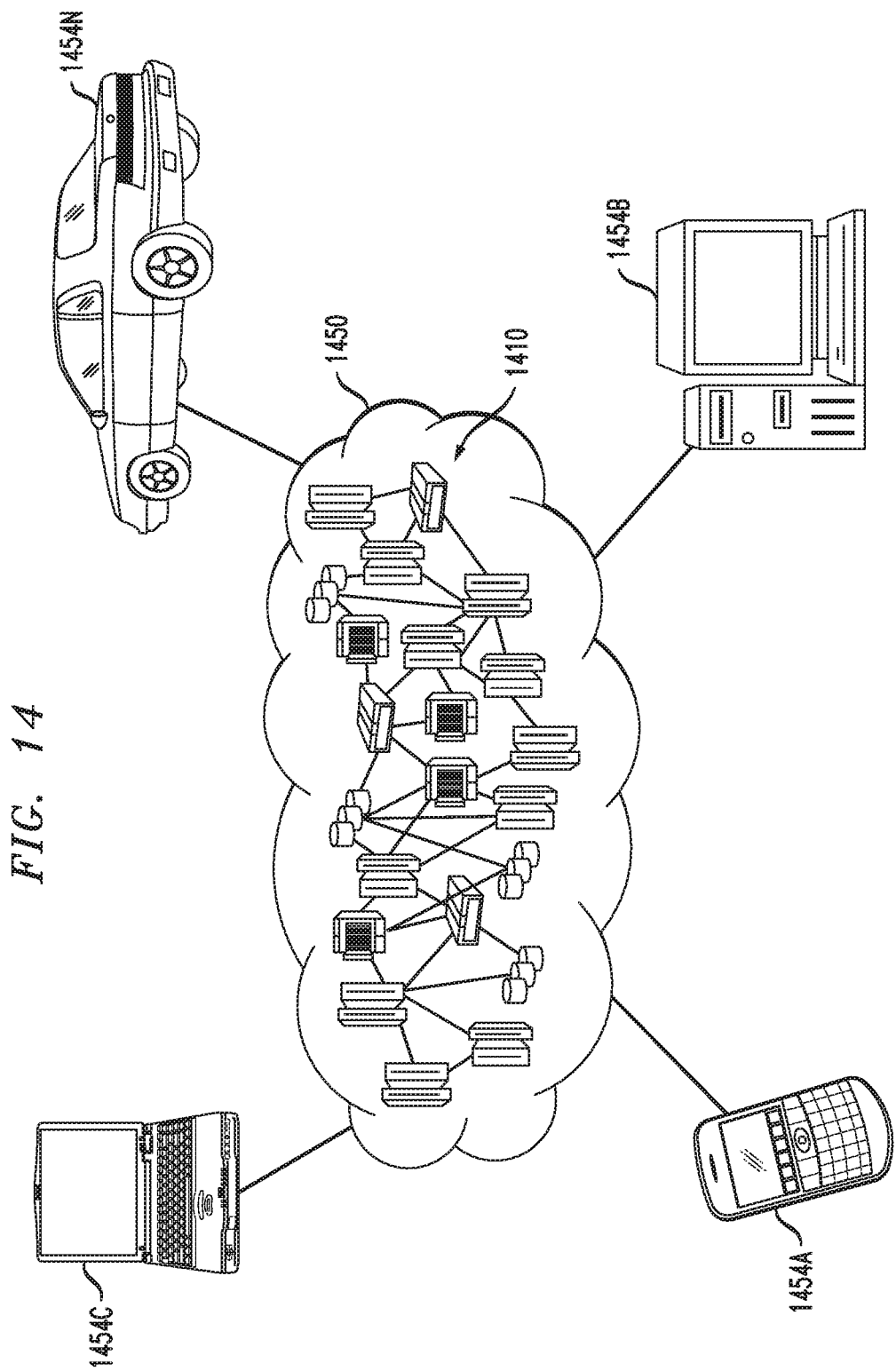
FIG. 14 depicts a cloud computing environment, according to an exemplary embodiment of the present invention.

Referring now to FIG. 14, illustrative cloud computing environment 1450 is depicted. As shown, cloud computing environment 1450 comprises one or more cloud computing nodes 1410 with which local computing devices used by cloud consumers, such as, for example, a wearable device (not explicitly shown), a personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
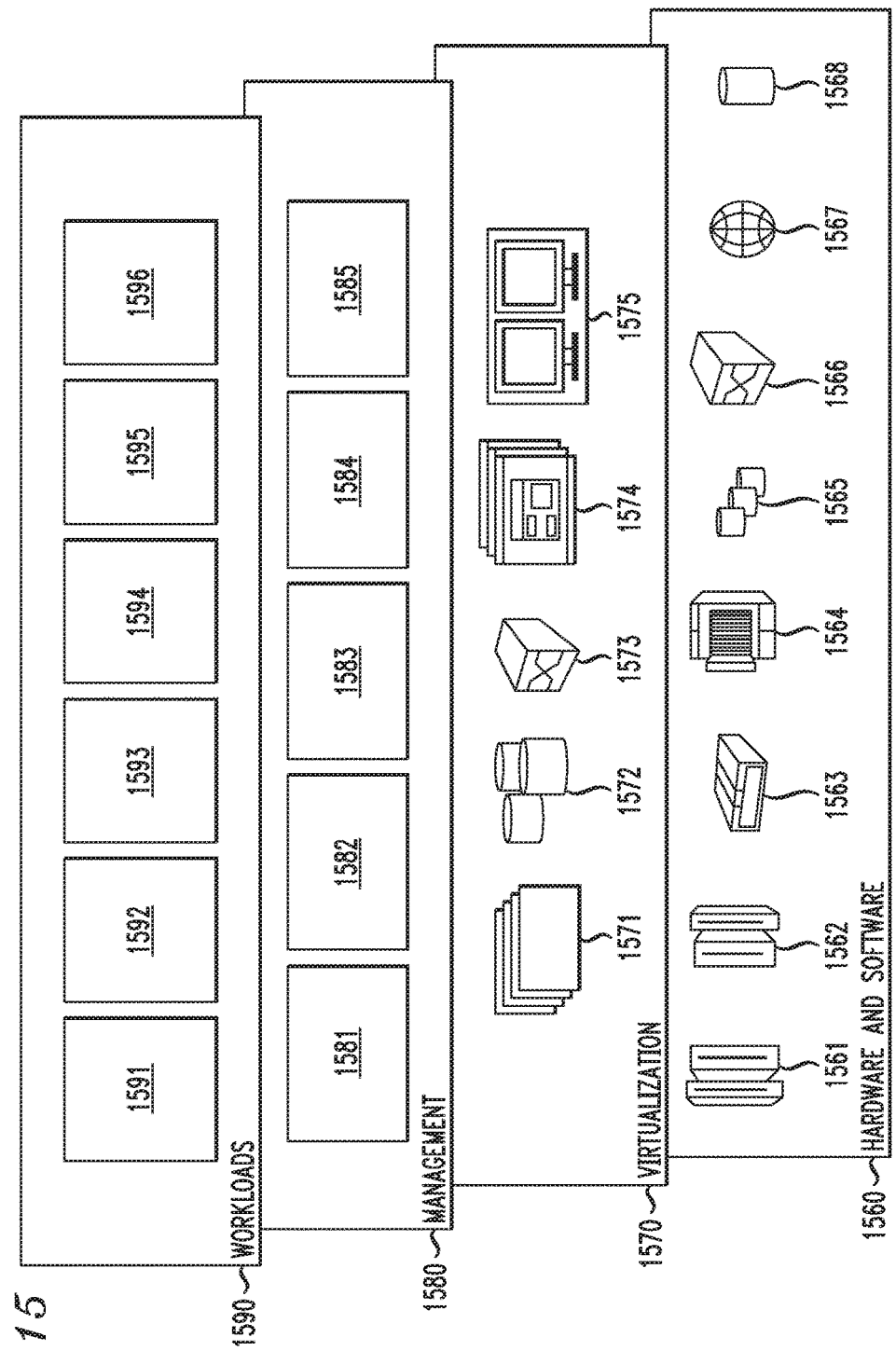
FIG. 15 depicts abstraction model layers, according to an exemplary embodiment of the invention.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566, in some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and pattern neutralizing 1596, which may implement the functionality described above with respect to FIGS. 1-15.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for neutralizing a pattern of user activity, comprising:
    collecting data corresponding to the user activity;
    generating a user distribution over a domain comprising a plurality of respective elements based on the collected data, wherein the user distribution indicates frequencies of the plurality of respective elements;
    determining a transformation function to neutralize the user distribution;
    applying the transformation function to neutralize the user distribution;
    wherein applying the transformation function comprises modifying the frequencies of the plurality of respective elements to generate a neutralized user distribution indicating the modified frequencies of the plurality of respective elements;
    transmitting a first output based on the user distribution to a first user performing the user activity; and
    transmitting a second output based on the neutralized user distribution to a second user monitoring the user activity;
    wherein the method is performed by at least one computer system comprising at least one memory and at least one processor coupled to the memory.

2. The method according to claim 1, wherein the data comprises terms used by the first user in connection with performing a plurality of searches in a search engine.

3. The method according to claim 2, wherein the plurality of respective elements comprise a plurality of search terms related to a topic.

4. The method according to claim 3, wherein applying the transformation function comprises generating a plurality of neutralizing search terms.

5. The method according to claim 4, wherein the plurality of neutralizing search terms are applied to the search engine.

6. The method according to claim 5, wherein plurality of neutralizing search terms are applied to a background of the search engine.

7. The method according to claim 1, wherein applying the transformation function transforms the user distribution from a non-uniform distribution into the neutralized user distribution, wherein the neutralized user distribution is a uniform distribution.

8. The method according to claim 1, wherein applying the transformation function transforms the user distribution into the neutralized distribution, wherein the neutralized user distribution is based on an averaged distribution of a plurality of users.

9. The method according to claim 1, further comprising providing the first user with an interface to determine whether the transformation function yields a transformed user distribution based on a uniform distribution or an averaged distribution of a plurality of users.

10. A system for neutralizing a pattern of user activity, comprising:
    a memory and at least one processor coupled to the memory, wherein the at least one processor is configured to:
    collect data corresponding to the user activity;
    generate a user distribution over a domain comprising a plurality of respective elements based on the collected data, wherein the user distribution indicates frequencies of the plurality of respective elements;
    determine a transformation function to neutralize the user distribution;
    apply the transformation function to neutralize the user distribution;
    wherein in applying the transformation function, the at least one processor is configured to modify the frequencies of the plurality of respective elements to generate a neutralized user distribution indicating the modified frequencies of the plurality of respective elements;
    transmit a first output based on the user distribution to a first user performing the user activity; and
    transmit a second output based on the neutralized user distribution to a second user monitoring the user activity.

11. The system according to claim 10, wherein the data comprises terms used by the first user in connection with performing a plurality of searches in a search engine.

12. The system according to claim 11, wherein the plurality of respective elements comprise a plurality of search terms related to a topic.

13. The system according to claim 12, wherein in applying the transformation function, the at least one processor is further configured to generate a plurality of neutralizing search terms.

14. The system according to claim 13, wherein the plurality of neutralizing search terms are applied to the search engine.

15. The system according to claim 14, wherein plurality of neutralizing search terms are applied to a background of the search engine.

16. The system according to claim 10, wherein applying the transformation function transforms the user distribution from a non-uniform distribution into the neutralized user distribution, wherein the neutralized user distribution is a uniform distribution.

17. The system according to claim 10, wherein applying the transformation function transforms the user distribution into the neutralized distribution, wherein the neutralized user distribution is based on an averaged distribution of a plurality of users.

18. The system according to claim 10, wherein the at least one processor is further configured to provide the first user with an interface to determine whether the transformation function yields a transformed user distribution based on a uniform distribution or an averaged distribution of a plurality of users.

19. A computer program product for neutralizing a pattern of user activity, the computer program product comprising a computer readable storage medium having program instructions embodied therewith, the program instructions executable by a processor to cause the processor to perform a method comprising:
    collecting data corresponding to the user activity;
    generating a user distribution over a domain comprising a plurality of respective elements based on the collected data, wherein the user distribution indicates frequencies of the plurality of respective elements;
    determining a transformation function to neutralize the user distribution;
    applying the transformation function to neutralize the user distribution;
    wherein applying the transformation function comprises modifying the frequencies of the plurality of respective elements to generate a neutralized user distribution indicating the modified frequencies of the plurality of respective elements;
    transmitting a first output based on the user distribution to a first user performing the user activity; and
    transmitting a second output based on the neutralized user distribution to a second user monitoring the user activity.

20. The computer product of claim 19, wherein the data comprises terms used by the first user in connection with performing a plurality of searches in a search engine.

* * * * *